(12) United States Patent
Laslo et al.

(10) Patent No.: US 10,722,061 B2
(45) Date of Patent: Jul. 28, 2020

(54) PERSONAL USE ACCESSORY

(71) Applicant: Attractive Accessories, LLC, Hellertown, PA (US)

(72) Inventors: Neil Laslo, Hellertown, PA (US); Jamie Laslo, Hellertown, PA (US)

(73) Assignee: Attractive Accessories, LLC, Hellertown, PA (US)

( * ) Notice: Subject to any disclaimer, the term of this patent is extended or adjusted under 35 U.S.C. 154(b) by 0 days.

(21) Appl. No.: 16/125,270

(22) Filed: Sep. 7, 2018

(65) Prior Publication Data

US 2019/0069702 A1    Mar. 7, 2019

Related U.S. Application Data

(60) Provisional application No. 62/555,160, filed on Sep. 7, 2017.

(51) Int. Cl.
| | | |
|---|---|---|
| *A47G 29/08* | (2006.01) |
| *F16B 1/00* | (2006.01) |
| *F16M 13/02* | (2006.01) |
| *A47G 1/17* | (2006.01) |
| *A47K 10/12* | (2006.01) |
| *A47G 1/02* | (2006.01) |
| *A47K 3/28* | (2006.01) |

(52) U.S. Cl.
CPC ............... *A47G 29/08* (2013.01); *A47G 1/02* (2013.01); *A47G 1/17* (2013.01); *A47K 3/281* (2013.01); *A47K 10/12* (2013.01); *F16B 1/00* (2013.01); *F16M 13/022* (2013.01); *A47K 2201/02* (2013.01); *F16B 2001/0035* (2013.01)

(58) Field of Classification Search
CPC . A47G 29/08; A47G 1/02; A47G 1/17; A47K 3/281; A47K 10/12; A47K 2201/02; F16M 13/022; F16B 1/00; F16B 2001/0035
USPC ........................... 248/466, 467, 206.5, 309.4
See application file for complete search history.

(56) References Cited

U.S. PATENT DOCUMENTS

| | | | | |
|---|---|---|---|---|
| 5,682,653 A | * | 11/1997 | Berglof | ..................... G09F 1/10 24/303 |
| 6,431,508 B1 | * | 8/2002 | Courson | .................. A47G 1/17 248/205.3 |
| 6,491,271 B1 | * | 12/2002 | Adams | ..................... A47G 1/17 248/206.5 |
| 7,699,277 B2 | * | 4/2010 | Bagnall | ................ A01K 63/006 119/230 |

(Continued)

*Primary Examiner* — Muhammad Ijaz
(74) *Attorney, Agent, or Firm* — Caesar Rivise, PC

(57) ABSTRACT

A personal use accessory comprising a utility plate having a front side and a rear side, a backing plate having a front side and a rear side, a first plurality of magnetically attractive elements disposed upon the rear side of said utility plate, a second plurality of magnetically attractive elements disposed upon the front side of said backing plate, and a utility element; said first and second plurality of magnetically attractive elements arranged to permit magnetic attraction between at least a subset of said first plurality of magnetically attractive elements and at least a subset of said second plurality of magnetically attractive elements, said magnetic attraction being of sufficient total force to support the personal use accessory when said utility plate and said backing plate are separated by a non-magnetic divider.

8 Claims, 5 Drawing Sheets

(56) References Cited

U.S. PATENT DOCUMENTS

| | | | | |
|---|---|---|---|---|
| 8,567,744 B1* | 10/2013 | Marn | ............... | F16M 11/041 |
| | | | | 248/548 |
| 8,739,453 B1* | 6/2014 | Conner | ............... | F41A 23/18 |
| | | | | 248/206.5 |
| 9,153,152 B1* | 10/2015 | Elmer | ............... | H01F 7/0221 |
| 2004/0047052 A1* | 3/2004 | Zadro | ............... | A45D 42/16 |
| | | | | 359/855 |
| 2005/0076851 A1* | 4/2005 | Allis | ............... | A01K 63/042 |
| | | | | 119/261 |
| 2006/0090278 A1* | 5/2006 | Hang | ............... | A47L 1/12 |
| | | | | 15/220.2 |
| 2006/0192062 A1* | 8/2006 | Tunze | ............... | A01K 63/10 |
| | | | | 248/206.5 |
| 2009/0250576 A1* | 10/2009 | Fullerton | ............... | G09F 3/00 |
| | | | | 248/206.5 |
| 2014/0263908 A1* | 9/2014 | Franklin | ............... | F16B 1/00 |
| | | | | 248/309.4 |
| 2016/0003270 A1* | 1/2016 | Franklin | ............... | F16B 1/00 |
| | | | | 439/529 |

* cited by examiner

PERSONAL USE ACCESSORY

CROSS REFERENCE TO RELATED APPLICATION

This application claims the benefit of and replaces U.S. provisional patent application No. 62/555,160, entitled MAGNETICALLY MOUNTED ARTICLE, filed Sep. 7, 2017, which is hereby incorporated in its entirety by reference.

BACKGROUND OF THE INVENTION

The invention described herein relates generally to the field of consumer articles and more specifically to a personal use accessory.

BACKGROUND

Existing bathroom and shower accessories and accessory holders, including those for personal mirrors, have certain limitations, making them inadequate for effective use in desired locations, such as the home shower environment. The limitations of present apparatus include non-secure mounting approaches, using known elements such as suction cups, which may slip, or adhesives, which may mar or otherwise damage surfaces and do not perform well in wet conditions and may fail, causing the mirror to fall and break. Wall mounted mirrors using known mounting methods, particularly when used in wet environments such as showers, frequently fall, causing the mirror to break which risks injury to people. Mirrors lacking mounting means of any kind require the user to utilize at least one hand to hold the mirror, thereby precluding the use of two hands for the primary desired activity related to the mirror, such as shaving, hairstyling, or the like.

Shower mirrors and accessory holders, for items such as razors and loofahs, are now typically held by suction cups or other permanent or temporary forms of mechanical fastening. Suction cups lose suction and slide and/or fall resulting in broken mirrors and potential injury. Mechanical fasteners may not be capable of being moved without damage to the accessory holder or the mounting surface and require a certain level of knowledge to install on to various surfaces. Articles mounted using adhesive products, such as double sided tape often lose adhesion in wet environments, requiring replacement of the adhesive, and also require the adhesive to be replaced if the item is to be moved to a new location.

Due to the unreliable mounting strength, items that could otherwise be held by wall-mounted accessories, such as washcloths, typically get wrapped around the temperature controls and/or bath faucet, interfering with the normal operation of those shower elements and preventing the items from drying and otherwise being securely stored. Other items, such as razors, may be laid on shelves or bathtub edges, where they are susceptible to causing injury when unintentionally touched or when they fall.

Prior articles have also included shower mirrors that need to be mechanically secured to a shower head, either in simple mechanical arrangement—such as by hanging over the shower head with a wire, bent frame portion, or similar mechanism—or in conjunction with the plumbing for such shower head. These are not easily used for personal activities such as shaving because of where the mirror is positioned in relation to the shower stream and the fixed height of the anchor point. Further difficulty with such products arise when placed in a more modern bathroom using rain shower heads mounted to the ceiling, which lack a location permitting the use of this type of mirror or other accessory holder.

A need therefore remains for an improved magnetic personal use accessory mounting apparatus.

BRIEF SUMMARY OF THE INVENTION

The magnetically mounted personal use accessory of the present invention was designed to help alleviate the concerns listed above. The magnetically mounted article generally comprises a utility plate and a backing plate, each having magnetically attractive members for coupling the plates to one another for mounting on a surface having two accessible sides. The article further comprises a utility element, which in certain embodiments may comprise a mirror and/or accessory plate for insertion into, or manufactured integral to, the utility plate.

DETAILED DESCRIPTION OF THE INVENTION

Figure 1:
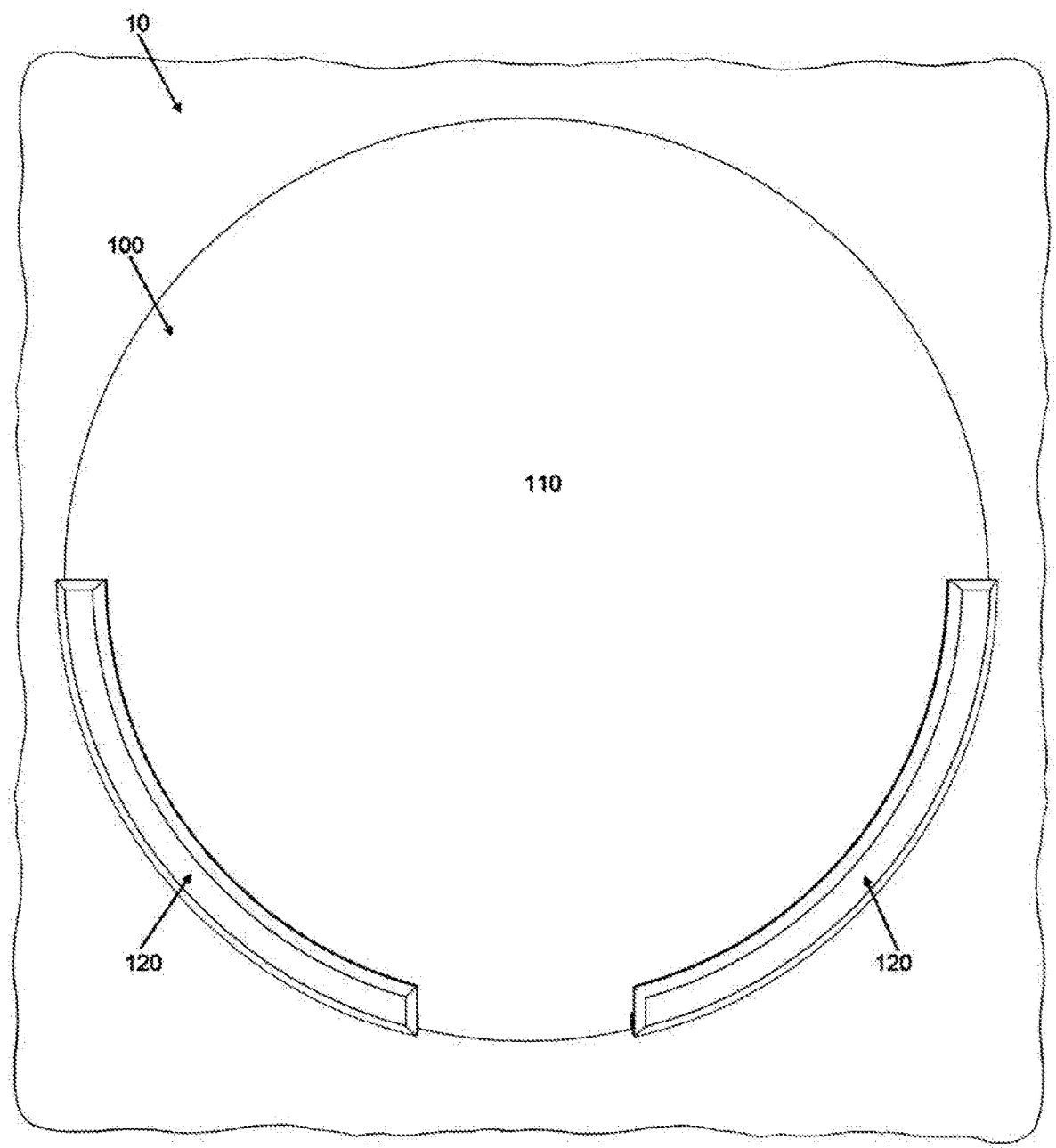
FIG. 1 is a front elevation view of an exemplary embodiment of a personal use accessory constructed in accordance with this invention shown mounted on a non-metallic divider plate.

The invention of the present disclosure is described below with reference to certain embodiments. While these embodiments are set forth in order to provide a thorough and enabling description of the invention, these embodiments are not set forth with the intent to limit the scope of the disclosure. A person of skill in the art will understand that the 15 invention may be practiced in numerous embodiments, of which those detailed here are merely examples. In order to allow for clarity of the disclosure of the claimed invention, structures and functions well known to those skilled in the art are not here disclosed. Those skilled in the art should also realize that equivalent embodiments do not depart from the spirit and scope of the invention in its broadest form.

The purpose of this product is to provide a different means of attaching an object to a fixed surface such as a shower door by using magnets. Using this product for shaving has multiple benefits. First, shaving in the shower is more beneficial than shaving outside of the shower. The facial hair is softened by the warm water creating a less irritable shave. Second, having this mirror attached at eye level allows the user to see what he is doing. Third, the mirror is removable from its utility plate so it can be heated using the shower water to prevent fogging. If a mirror is not used in the shower, it can be replaced with an accessory plate to hang razors, loofahs and washcloths. Multiple shapes and sizes allow for various uses and customization. If not used for shaving purposes, this product can be placed in any location suitable for the consumer a fixed surface.

A backing plate portion of the present invention is placed on the outside of a fixed surface, such as a shower curtain, stationary or sliding glass door, or fixed pane. It has been designed in order to operate on a sliding glass door without inhibiting the doors natural movement. That is, the article of the present invention may pass between two sliding shower doors while mounted to one of said doors. Each plate of the article has one or more magnets depending on the size and shape of the article and the surface to which it is being attached. The thicker the surface the stronger the magnet. The magnets are aligned in opposition with the magnets on the utility plate.

In some embodiments, the magnets of the backing plate may be placed in relation to the depth of the main part of the backing plate such that, in addition to magnetic coupling with the utility plate through the mounting surface, magnetic force will also permit application of decorative elements to the outward facing side of the backing plate. For example, a magnetic decorative decal can be attached to the surface facing away from the fixed object. One such application is the use of a magnetic paper element to display purely decorative elements such as flowers or affinity designs, such as those of sports teams or comic book characters.

The magnets may be proud of the backing plate to create air flow between the backing plate and the fixed surface to reduce mildew and moisture. It also reduces the surface contact of the backing plate with the fixed surface creating a better union with the utility plate by preventing interruption of the magnetic coupling due to the presence of debris, mold, or other solids or liquids on the non-magnetic portions of the utility plate and backing plate surfaces. In some embodiments, the magnets are integrated into the backing plate and covered by a rubberized material to create more friction to reduce sliding. The purpose of integrating the magnets is two-fold: to protect the magnets from corrosion and breakage or dislodging; and to eliminate the need for adhesives in attaching the magnets to the backing plate.

The second piece is a utility plate that is placed on the adjacent side of the fixed surface in alignment with the backing plate. It has one or more magnets depending on the size and shape of the mountable object, and the physical properties of the surface it is being attached to. The magnets of the utility plate are aligned in opposition with the magnets on the backing plate. Stronger magnets may be employed in order to permit magnetic coupling through thicker surfaces. The number of magnets may also be chosen to aid in the total magnetic force of attraction between the backing plate and utility plate. Magnet size may also vary based either on the size of the utility and backing plates or on considerations of magnetic properties, which will be understood by those skilled in the art. This variability of magnet number, size, placement and force permit numerous embodiments of the present invention, such as large embodiments for home use or small embodiments suitable for travel. The magnets may be proud of the utility plate to create air flow between the utility plate and the fixed surface to reduce mildew and accumulation of moisture. It also reduces the surface contact of the utility plate with the fixed surface creating a better union with the backing plate, as described above. In some embodiments, the magnets are integrated into the utility plate and covered by a rubberized material to create more friction to reduce sliding. The purpose of integrating the magnets is two-fold: to protect the magnets from corrosion and breakage or dislodging; and to eliminate the need for adhesives in attaching the magnets to the utility plate. On the front of the utility plate in some embodiments there will be an indentation for the purposes of fastening the accessory plate to the utility plate in order to reduce the likelihood of accidentally removing the accessory plate when grasping an item such as a razor or loofah. The utility plate also consists of one or more flanges that accept an accessory plate or a mirror. In some embodiments the mirror may include an integral backing, permitting the storage of the mirror inwardly facing, thereby protecting the mirror when it is not in use, is stored, or in transit. Within the flanges of the utility plate there are several small drainage holes. These holes aid in airflow in order to reduce mold and mildew.

The utility plate in conjunction with the backing plate may be utilized on any rigid or non-rigid surface whose physical properties permit the magnetic conductivity of the magnetically attractive elements between the two plates. While the invention is described with respect to a solid shower door other mounting services may include shower curtains and other surfaces where both sides are accessible for placement of the utility and backing plates in magnetic communication.

The accessory plate is an object of similar shape to the utility plate. The back is a smooth surface with a tab that is aligned with the indentation on the utility plate. The indentation on the utility plate and the tab on the back of the accessory plate align for the purpose of fastening the accessory plate to the utility plate in order to reduce the likelihood of accidentally removing the accessory plate when grasping an item such as a razor or loofah. The front of the accessory plate will have an indentation to assist in removing the accessory plate from the utility plate. On the front of the accessory plate are one or more supports arranged to hold objects of the user's choosing, such as razors, loofahs and washcloths. The supports are of multiple shapes and sizes to allow for various uses and customization. For example, the supports may include end caps, hooks, eyelets, or other useful configurations for receiving hanging articles.

FIG. 1 shows a front view of an exemplary embodiment of the present invention shown mounted on a non-magnetic divider, such as a shower curtain, stationary or sliding glass door, or fixed pane. The utility plate 100 is comprised of a main surface 110 and utility element 120, illustrated here as a flange forming a receiving channel and shaped to coincide with an accessory plate, such as a mirror or other accessory plate to be inserted into and held by the flange. As shown, the flange utility element 120 may be arranged in multiple sections. It will be understood that a single flange, without interruption, would fall within the scope of the present disclosure.

Figure 2A:
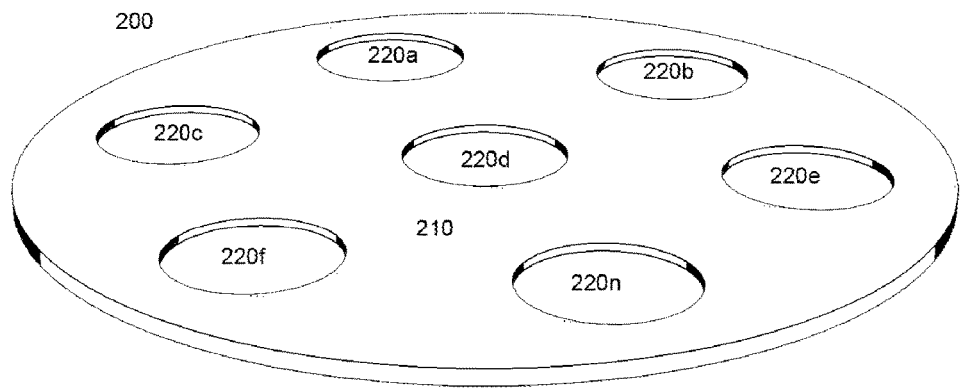
FIG. 2a is a perspective view of a backing plate.
Figure 9:
FIG. 9 is an enlarged side elevation view of an exemplary magnetic attractive element such as used in the utility and backer plates.

FIG. 2a shows an exemplary backing plate 200. The backing plate has a main surface 210. The embodiment shown includes a plurality of receiving recesses 220 *a-n*, which may receive magnetically attractive elements, such as magnets or ferromagnetic articles, for coupling the backing plate to the opposing magnetically attractive elements of the utility plate, which may similarly be, without limitation, magnets or ferromagnetic articles. The magnetically attractive elements may be held in the magnet receiving recesses 220*a-n* utilizing friction or adhesives, but in some embodiments, may be held in place by an additional molded overlay or an otherwise disposed overlay of one of various materials, such as rubber, forming a grip material, which will retain the magnetically attractive elements and may, as in the case of rubber, increase the static friction between the magnetically attractive elements and the mounting surface to reduce slippage, movement, or falling. As shown in FIG. 9, in certain embodiments, the grip material 900 is disposed on one or more of the magnetically attractive elements 230*a-n* solely for its gripping properties and not for the purpose of retaining the magnetically attractive element on the backing plate. The foregoing may apply equally to the utility plate.

Figure 2B:
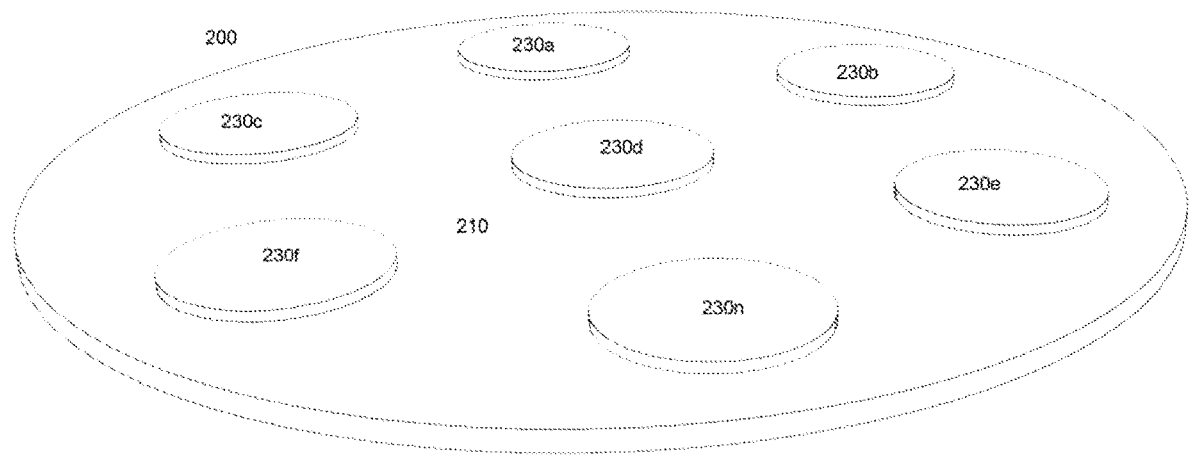
FIG. 2b is a perspective view of a backing plate.

The exemplary embodiment of FIG. 2*b* shows the backing plate 200 having a first plurality of magnetically attractive elements 230*a-n* coupled to the magnet receiving recesses. In this embodiment the depth of the magnetically attractive elements 230*a-n* is greater than the depth of the magnet receiving recesses, thereby permitting the magnetically attractive elements 230*a-n* to couple to the opposed magnetically attractive elements of the utility plate without interruption that may be caused by irregularities on the non-magnetic portions of the backing plate or the non-magnetic divider through which the utility and backing plates are placed in magnetic communication, such as by the presence of dirt, soap residue, mold, water, textile irregularities, or otherwise.

Figure 2C:
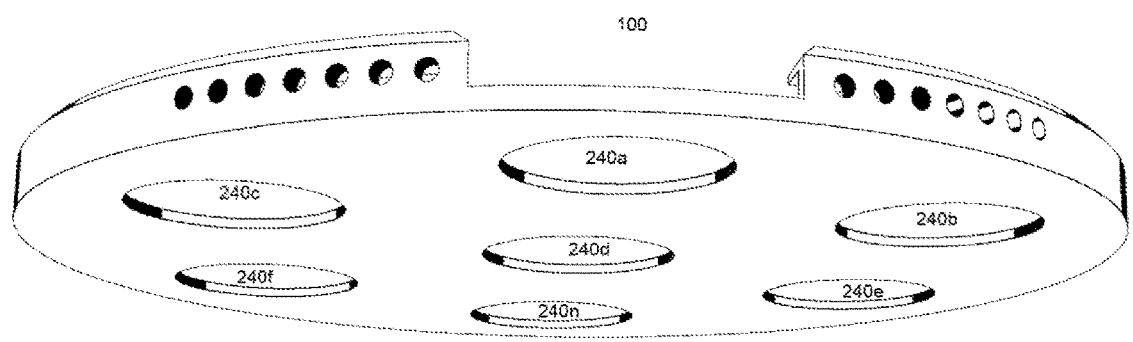
FIG. 2c is a perspective view of a utility plate.

FIG. 2*c* shows the utility plate 100 of an exemplary embodiment wherein a second plurality of magnetically attractive elements 240*a-n* corresponds to the first plurality of magnetically attractive elements 230*a-n* previously described. Arrangement of the first and second plurality of magnetically attractive elements disposed upon the backing and utility plates, respectively, in such a manner permits arrangement of the same to prevent or significantly reduce rotation of either plate, thereby decreasing the likelihood of decoupling of the magnetic elements, which decoupling would otherwise cause the accessory to fall.

Figure 3:
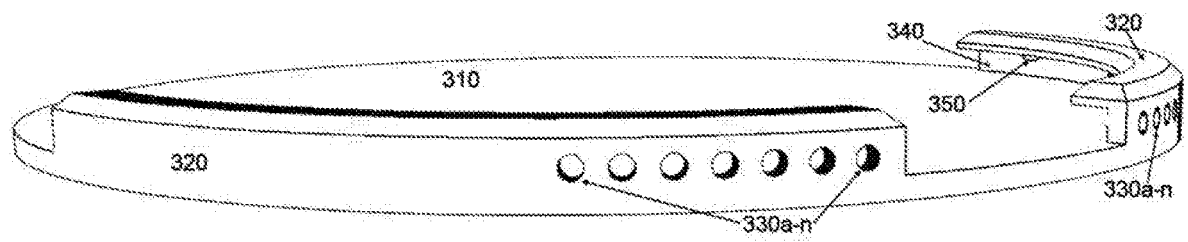
FIGS. 3 and 4 are respective perspective views of a utility plate.

FIG. 3 is a perspective view of an exemplary embodiment of a utility plate. Similar to FIG. 1, FIG. 3 depicts the main surface 310 and the utility element 320 in the form of integrally disposed flanges. The arrangement of the flange utility elements 320 with respect to the main surface 310 forms a receiving channel 340 into which the mirror or accessory plate is inserted by the user. The main surface, utility elements, and receiving channel elements in combination securely retain the inserted object. The flange is further illustrated in this exemplary embodiment having a plurality of drains 330*a-n*, which permit water, debris, and other materials to drain from the utility element and receiving channel areas. This reduces the likelihood of mildew growth and accumulation of dirt or debris, while permitting that water may run over the accessory plate surface, either intentionally or unintentionally.

Figure 4:
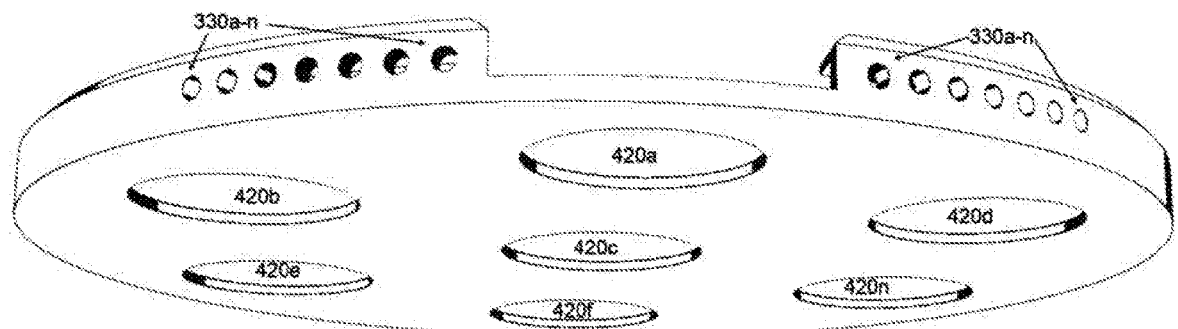

FIG. 4 provides an additional perspective view of an exemplary embodiment of the utility plate having receiving recesses 420*a-n* analogous, and functioning similarly to, those shown with respect to the backing plate in the previous figures. These receiving elements may be arranged to coincide with the receiving elements of the backing plate, either with respect to all of the recesses or a subset of them, allowing the surfaces of the opposing magnetically attractive elements inserted therein to be in magnetic communication either in whole or in part. As previously stated, coupling the magnetically attractive elements disposed upon the utility and backing plates in such a manner permits arrangement of the same to prevent or significantly reduce rotation of either plate, thereby decreasing the likelihood of decoupling of the magnetic attraction, which decoupling would otherwise cause the object to fall. This magnetic placement is a significant improvement over known prior art.

Figure 5:
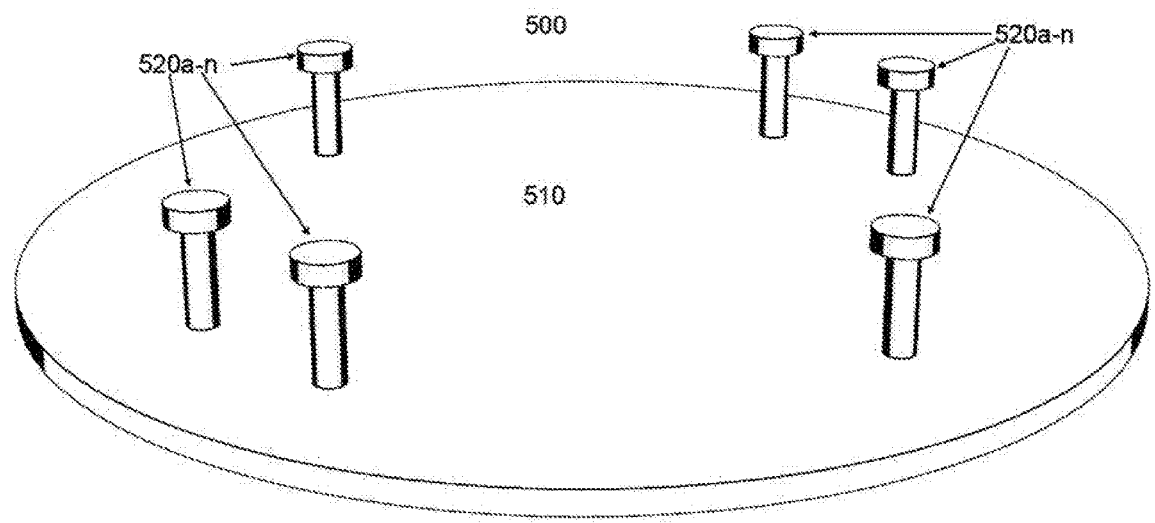
FIG. 5 is a perspective view of an accessory plate.

Turning now to FIG. 5, an exemplary embodiment of an accessory plate 500 in accordance with the present invention is shown. The main surface 510 of the accessory plate is similar in shape to other exemplary accessory plates, such as a mirror, and to the utility element and receiving channel of the utility plate. As such, the accessory plate may be received by the utility plate and held securely in the receiving channel by its combination with the main surface and utility element. Accessory holders 520*a-n* may be used as similarly to the utility elements and permit the hanging of various articles at the desire of the user, such as loofahs, washcloths, razors, children's toys and other objects.

Figure 6:
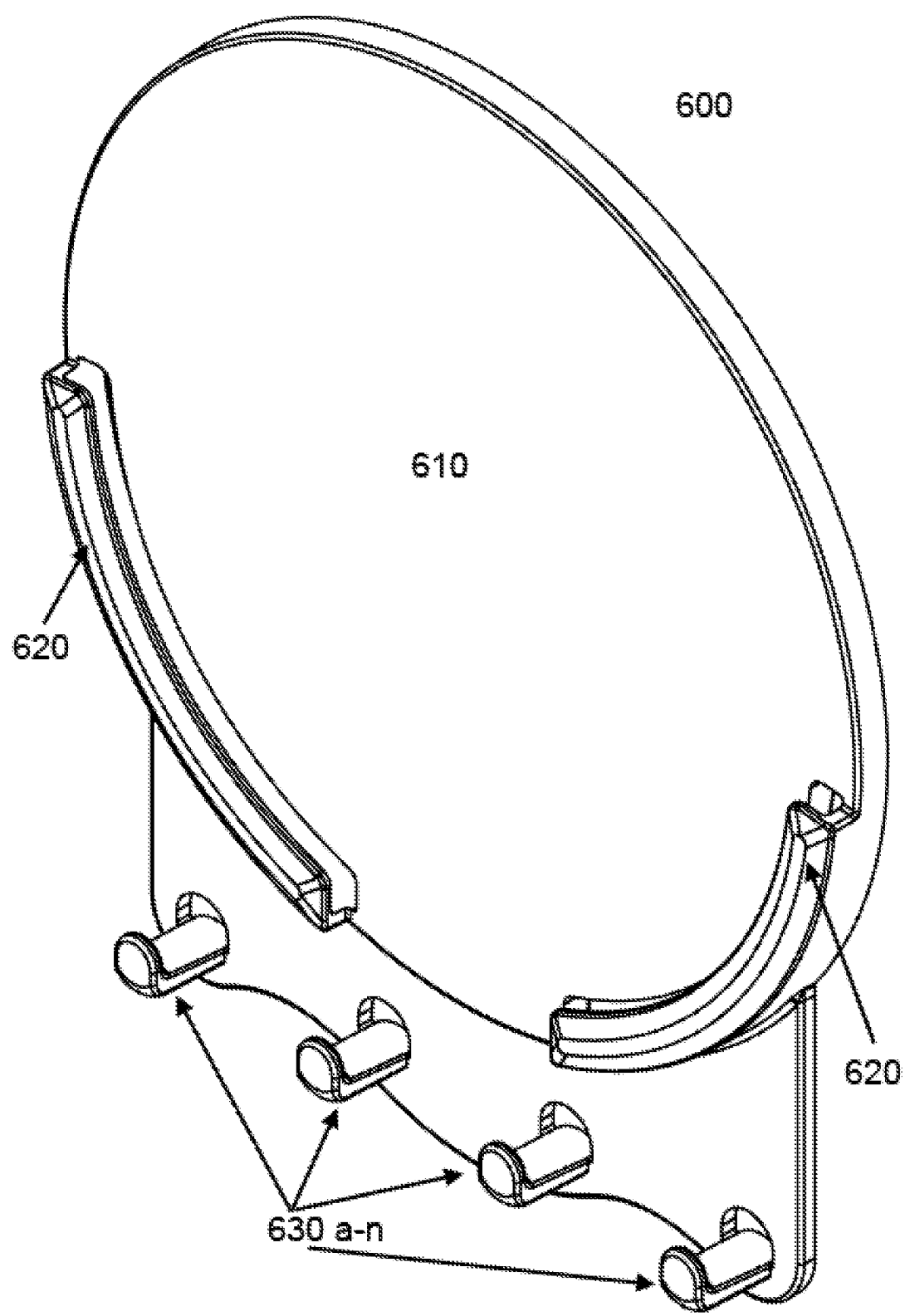
FIGS. 6-8 are perspective views of various embodiments of a utility plate.

To increase the available functions of the accessory of the present invention, multiple embodiments of the utility elements may be employed simultaneously. As shown in FIG. 6, a receiving channel 620 formed as multiple flanges and hooks 630*a-n* are each disposed—in this non-limiting, illustrative case—by being integrally manufactured to the utility plate.

Figure 7:
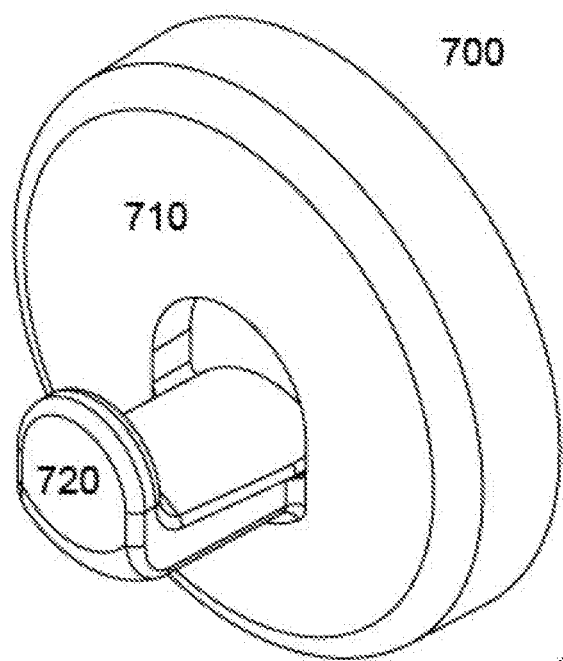
Figure 8:
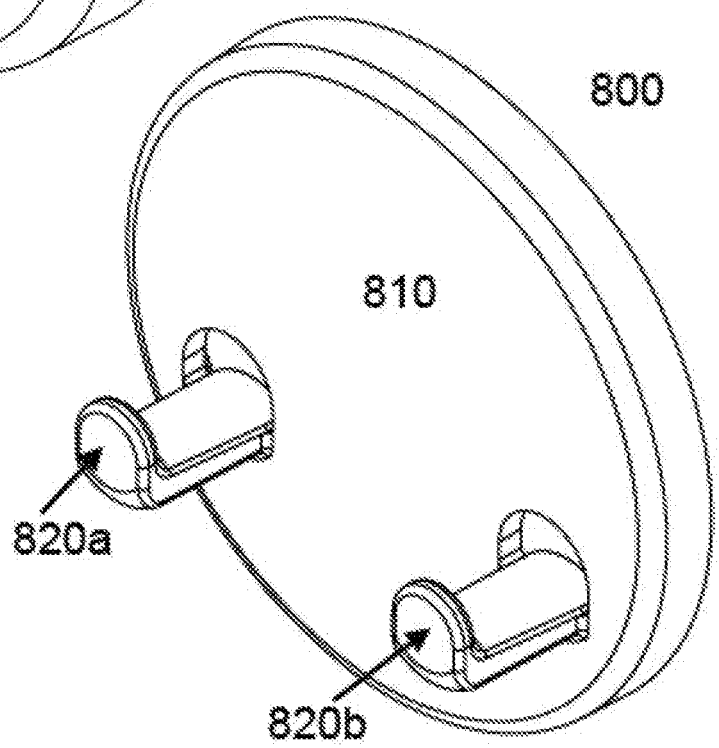

The placement of the utility elements may be chosen to facilitate their use for certain intended purposes, such as the embodiments of the accessory 700 shown in FIG. 7 wherein a single utility element 720 is shown in the form of a hook for hanging an object or the accessory 800 of FIG. 8 wherein the utility element 820*a*, 820*b* comprises two hooks which, by their arrangement may allow the safe placement of items such as a shaving razor.

In some embodiments of the present invention, the accessory plate may have one or more indentations in its surface corresponding to nubs on the inner surface of the receiving channel or other utility element. Inserting the accessory plate into the receiving channel in such an embodiment causes the engagement of the nubs and indentations, increasing the security of the hold of the inserted object and providing added stability.

In yet other embodiments, the inner surface of the flange only may include nubs 350 (FIG. 3), such as of soft rubber, which would maintain a grip on the inserted mirror or other accessory plate, providing another method for providing security of the inserted object. One of skill in the art will understand that the placement of such nubs and indentations may be reversed between the utility element and accessory plate or otherwise combined to achieve the same function.

While various disclosed embodiments have been described above, it should be understood that they have been presented by way of example only, and not limitation. Numerous changes to the subject matter disclosed herein can be made in accordance with this disclosure without departing from the spirit or scope of this disclosure. In addition, while a particular feature may have been disclosed with respect to only one of several implementations, such feature may be combined with one or more other features of the other implementations as may be desired and advantageous for any given or particular application.

What is claimed is:

1. A personal use accessory configured for direct mounting and support on a non-magnetic divider, said personal use accessory comprising:
   a utility plate having a front side and a rear side;
   a backing plate having a front side and a rear side;
   at least one accessory plate, said at least one accessory plate being a mirror;
   at least one receiving channel located on said front side of said utility plate and being configured to support said at least one accessory plate thereon;
   a first plurality of magnetically attractive elements disposed upon said rear side of said utility plate;
   a second plurality of magnetically attractive elements disposed upon said front side of said backing plate;
   said backing plate and said utility plate being configured so that the non-magnetic divider can be interposed between said rear side of said utility plate and said front side of said backing plate, whereupon at least one of said first plurality of magnetically attractive elements magnetically attracts at least one of said second plurality of magnetically attractive elements with sufficient force to directly support each other and mount said personal use accessory on the non-magnetic divider.

2. The personal use accessory of claim 1 wherein said receiving channel comprises a flange.

3. The personal use accessory of claim 1 wherein each of said first plurality of magnetically attractive elements is a magnet of one polarity and each of said second plurality of magnetically attractive elements is a magnet of opposite polarity to said one polarity.

4. The personal use accessory of claim 1 wherein said first and second plurality of magnetically attractive elements are ferromagnetic.

5. A personal use accessory configured for mounting on a non-magnetic divider, said personal use accessory comprising:
   a utility plate having a front side and a rear side;
   at least one utility element in a form of a receiving channel located on said front side of said utility plate, said receiving channel being configured to support at least one accessory plate thereon, said receiving channel comprising one or more drainage holes;
   a backing plate having a front side and a rear side;
   a first plurality of magnetically attractive elements disposed upon said rear side of said utility plate; and
   a second plurality of magnetically attractive elements disposed upon said front side of said backing plate;
   said backing plate and said utility plate being configured so that the non-magnetic divider is interposed between said rear side of said utility plate and said front side of said backing plate, with at least one of said first plurality of magnetically attractive elements being configured for magnetic attraction to at least one of said second plurality of magnetically attractive elements with sufficient force to support said personal use accessory on the non-magnetic divider.

6. A personal use accessory configured for mounting on a non-magnetic divider, said personal use accessory comprising:
   a utility plate having a front side and a rear side;
   at least one utility element in a form of a receiving channel located on said front side of said utility plate, said receiving channel being configured to support at least one accessory plate thereon;
   a backing plate having a front side and a rear side;
   a first plurality of magnetically attractive elements disposed upon said rear side of said utility plate; and
   a second plurality of magnetically attractive elements disposed upon said front side of said backing plate;
   said backing plate and said utility plate being configured so that the non-magnetic divider is interposed between said rear side of said utility plate and said front side of said backing plate, with at least one of said first plurality of magnetically attractive elements being configured for magnetic attraction to at least one of said second plurality of magnetically attractive elements with sufficient force to support said personal use accessory on the non-magnetic divider; and wherein said receiving channel further comprises a nub configured for gripping the at least one accessory plate.

7. A personal use accessory configured for mounting on a non-magnetic divider, said personal use accessory comprising:
   a utility plate having a front side and a rear side;
   at least one utility element in a form of a receiving channel located on said front side of said utility plate, said receiving channel being configured to support at least one accessory plate thereon;
   a backing plate having a front side and a rear side;
   a first plurality of magnetically attractive elements disposed upon said rear side of said utility plate; and
   a second plurality of magnetically attractive elements disposed upon said front side of said backing plate;
   said backing plate and said utility plate being configured so that the non-magnetic divider is interposed between said rear side of said utility plate and said front side of said backing plate, with at least one of said first plurality of magnetically attractive elements being configured for magnetic attraction to at least one of said second plurality of magnetically attractive elements with sufficient force to support said personal use accessory on the non-magnetic divider; and wherein a grip material is disposed upon an attractive surface of at least one of said first plurality of magnetically attractive elements and an attractive surface of at least one of said second plurality of magnetically attractive elements, said grip material being of a greater coefficient of friction than the grip material comprising said one of the first and second magnetically attractive elements upon which said material is disposed.

8. The personal use accessory of claim 7 wherein said grip material is an elastomer.

* * * * *